(12) United States Patent
Guzman et al.

(10) Patent No.: US 10,173,406 B2
(45) Date of Patent: Jan. 8, 2019

(54) FLUTED CORE SANDWICH SHELL EDGE JOINT

(71) Applicant: THE BOEING COMPANY, Chicago, IL (US)

(72) Inventors: Juan Carlos Guzman, Seattle, WA (US); Michael Leslie Hand, Huntington Beach, CA (US); Douglas McCarville, Bonney Lake, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/432,024

(22) Filed: Feb. 14, 2017

(65) Prior Publication Data
US 2018/0229489 A1    Aug. 16, 2018

(51) Int. Cl.
| | | |
|---|---|---|
| B32B 37/06 | (2006.01) | |
| B64G 1/00 | (2006.01) | |
| B32B 7/12 | (2006.01) | |
| B32B 37/12 | (2006.01) | |

(52) U.S. Cl.
CPC ............... *B32B 37/06* (2013.01); *B32B 7/12* (2013.01); *B32B 37/12* (2013.01); *B64G 1/002* (2013.01); *B32B 2250/40* (2013.01); *Y10T 428/195* (2015.01)

(58) Field of Classification Search
CPC ............. Y10T 428/195; Y10T 403/553; Y10T 403/635; B32B 2250/40
See application file for complete search history.

(56) References Cited

U.S. PATENT DOCUMENTS

| | | |
|---|---|---|
| 8,784,596 B2 | 7/2014 | Hand et al. |
| 8,875,931 B2 | 11/2014 | Hand et al. |

FOREIGN PATENT DOCUMENTS

| | | |
|---|---|---|
| EP | 2455625 A2 | 5/2012 |

OTHER PUBLICATIONS

Extended European Search Report for EP Application No. 17203716.0 dated Jul. 17, 2018.

*Primary Examiner* — Alexander S Thomas
(74) *Attorney, Agent, or Firm* — Marshall, Gerstein & Borun LLP (57) ABSTRACT

A composite wall assembly edge joint including a first composite buildup pad having a first tapered section is secured to and extends along a first composite face sheet. A second composite buildup pad having a second tapered section is secured to and extends along a second composite face sheet, wherein the first and second composite buildup pads are positioned between spaced apart first and second composite face sheets. A composite flute core member includes a tapered first portion positioned between and secured to the first tapered section and to the second tapered section. A second portion of the composite flute core member extends in a direction away from the tapered first portion of the composite flute core member and is positioned between, extends along and is secured to the first and second composite face sheets.

20 Claims, 8 Drawing Sheets

FLUTED CORE SANDWICH SHELL EDGE JOINT

FIELD

This disclosure generally relates to joints for composite materials and more particularly to a joint configuration for composite sandwich shell edges.

BACKGROUND

Composite structures are being developed to replace aluminum components for use with space launch vehicles. Replacement of aluminum components with lighter, lower cost, and less thermally conductive composite components will enable larger payloads, reduced operating costs and longer missions due to propellant boil-off reduction.

In the construction of the composite structures, composite fluted core sandwich shell wall assemblies were employed. These wall assemblies were used, for example, in the construction of an external structural wall assembly of a rocket or in the construction of a cryogenic tank assembly. Sections of the wall assemblies were joined together with joint edge structures so as to connect adjoining sections of the structure being assembled. As higher line load demands are encountered and needed than originally used in smaller rockets or structures positioned higher in a stack, for example, an improved edge joint construction is needed for constructing the structural assembly with composite fluted core sandwich shell wall sections.

The lighter load shell edge joints originally developed required relatively large openings between intermittently spaced shell edge reinforcements to allow extraction of tooling. As a result of the relatively large openings, that construction did not permit more closely spaced fasteners that would be needed for a joint that needed to carry a higher load capacity. The lighter load shell edge joint construction also forced load into the face sheets of the structure at the ends of the flutes which necessitated positioning a local doubler for carrying higher loads for which the original joint was not designed.

An improved shell edge joint for a composite fluted core sandwich shell wall is needed that will provide improved load carrying capabilities such that more load can be carried and distributed permitting additional and more closely spaced fasteners. This improved shell edge joint performance for increased load capacity needs to be accomplished with minimizing the increase in vehicle weight.

SUMMARY

An example of a composite wall assembly edge joint includes a first composite buildup pad having a first tapered section which is secured to and extends along a first composite face sheet. A second composite buildup pad having a second tapered section is secured to and extends along a second composite face sheet, wherein the first and second composite buildup pads are positioned between spaced apart first and second composite face sheets. A composite flute core member includes a tapered first portion positioned between and secured to the first tapered section and to the second tapered section. A second portion of the composite flute core member extends in a direction away from the tapered first portion of the composite flute core member and is positioned between, extends along and is secured to the first and second composite face sheets.

An example includes a method for assembling a composite wall assembly edge joint which includes the steps of laying up a first composite buildup pad having a first tapered section onto a cured first composite face sheet with an adhesive layer positioned between the first composite buildup pad and the first composite face sheet and the step of positioning a composite flute core member, including a first portion having a tapered section including a first inclined surface and a second inclined surface. The first inclined surface of the composite flute core member is positioned onto the first tapered section of the first composite buildup pad and a second portion of the composite flute core member extends from the first portion along first composite face sheet with an adhesive film positioned between the second portion and the first composite face sheet. The method further includes the step of heating at least the first composite buildup pad and the composite flute core member, co-curing the first composite buildup and the composite flute core member securing together the first tapered section of the first composite buildup pad with the first inclined surface of the composite flute core member and co-bonding the second portion of the composite flute core member to the first composite face sheet. The method further includes the step of laying up a second composite buildup pad having a second tapered section wherein the second composite buildup pad is positioned spaced apart from the first composite buildup pad and with at least a portion of the second tapered section of the second composite buildup pad overlying an adhesive film positioned overlying the second inclined surface of the first portion of the composite flute core member. The method further includes a step of heating at least the second composite build up pad and co-bonding the second composite buildup pad to the second inclined surface of the first portion of the composite flute core member.

The features, functions, and advantages that have been discussed can be achieved independently in various embodiments or may be combined in yet other embodiments further details of which can be seen with reference to the following description and drawings.

DESCRIPTION

Figure 1:
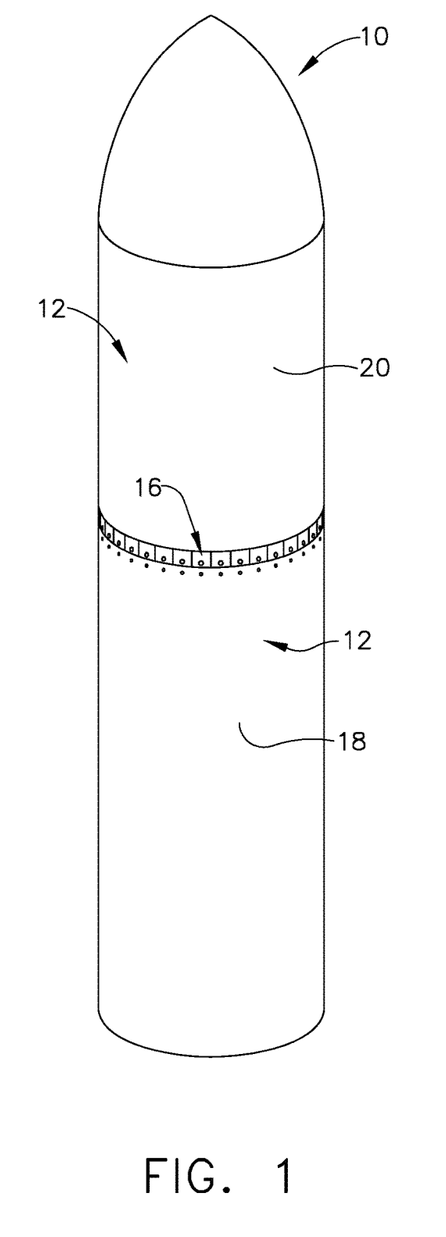
FIG. 1 is a schematic perspective view of a rocket showing an edge joint location on wall of rocket.
Figure 2:
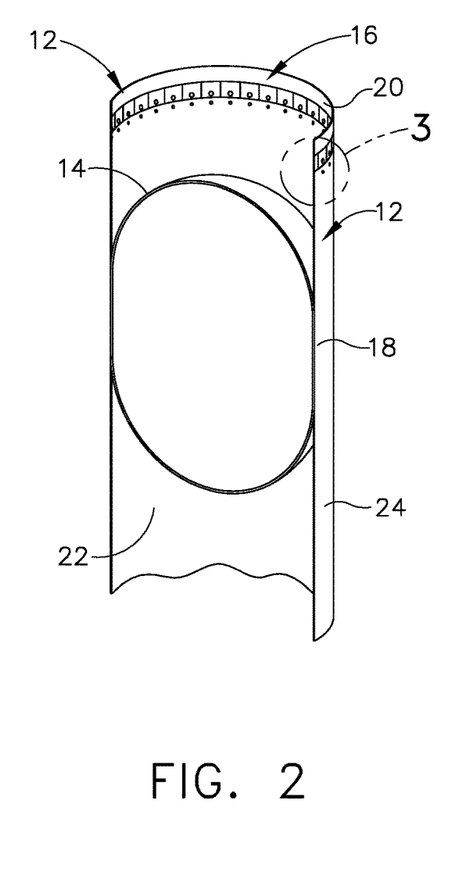
FIG. 2 is a partial cut away perspective view of a cross section of the rocket shown in FIG. 1 with a cryogenic propellant tank on board.

As mentioned earlier, composite structures are being developed to replace aluminum components or structures for use with a space launch vehicle or rocket 10, such as shown in FIGS. 1 and 2. Replacement of aluminum components with lighter, lower cost, and less thermally conductive composite components will enable larger payloads, reduced operating costs and longer missions due to propellant boil-off reduction.

In the construction of the composite components or structures, an example of such components or structures include using composite fluted core sandwich shell wall assemblies. These wall assemblies are used, for example, in the construction of different portions of rocket or launch vehicle 10 such as for an external structural wall assembly 12 of rocket 10, or in another example for a cryogenic propellant tank with a skirt assembly 14, as seen in FIGS. 1 and 2, respectively. Other components of various versions of rocket 10 can also be constructed with composite structures such as, an interstage section for a multiple stage rocket as well as for other portions of a rocket. As mentioned above, an example of assembling a composite sandwich shell wall assembly 12 with an improved joint edge 16 will be discussed herein. Improved joint edge 16 joins together, in this example, first section 18 to second section 20 of wall assembly 12 and will provide improved performance for higher line load demands with minimizing the increase in vehicle or rocket 10 weight.

Figure 3:
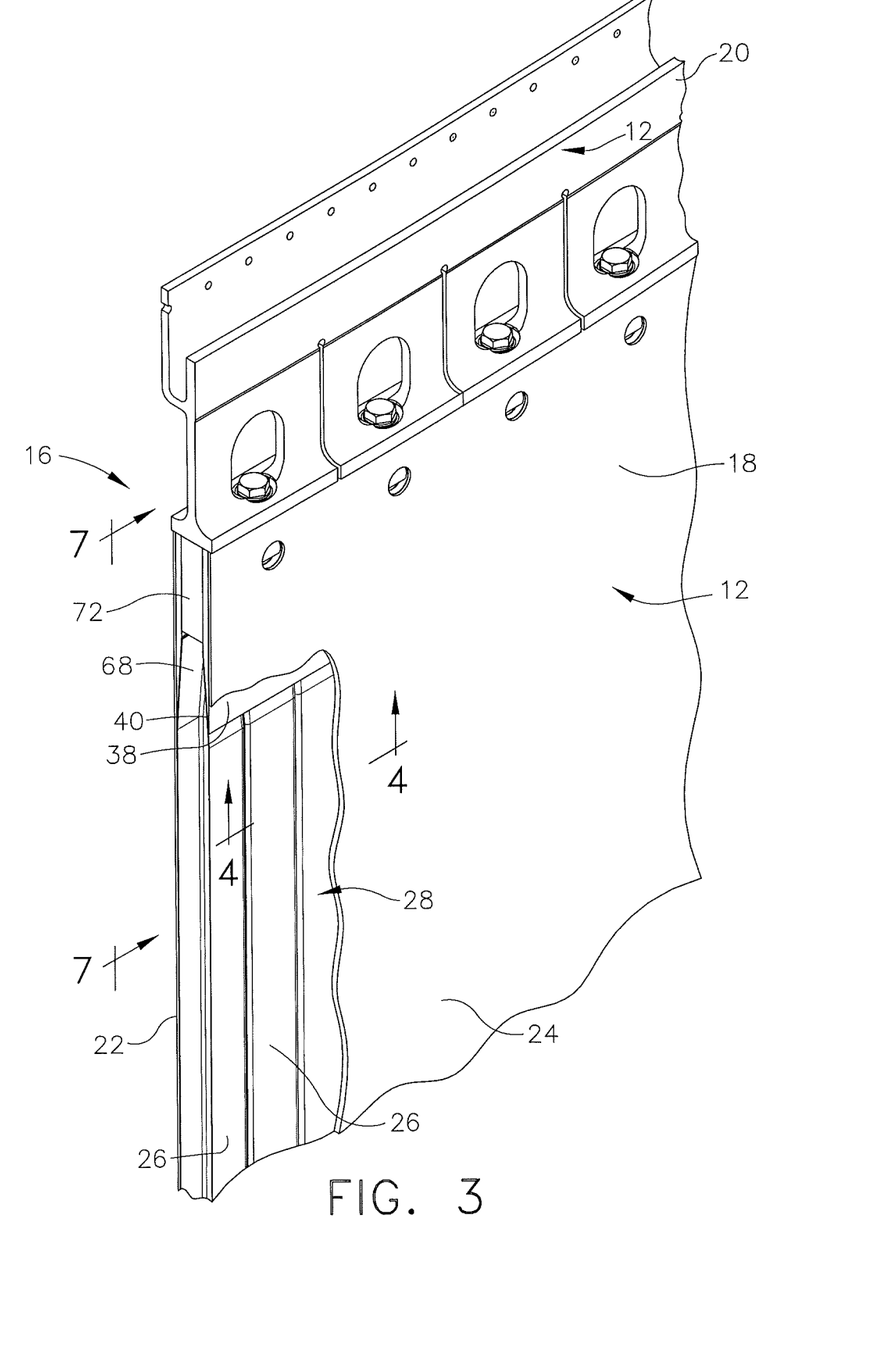
FIG. 3 is a an enlarged partial cut away view of the joint edge of a composite wall assembly of that which is encircled and designated as 3 in FIG. 2.
Figure 4:
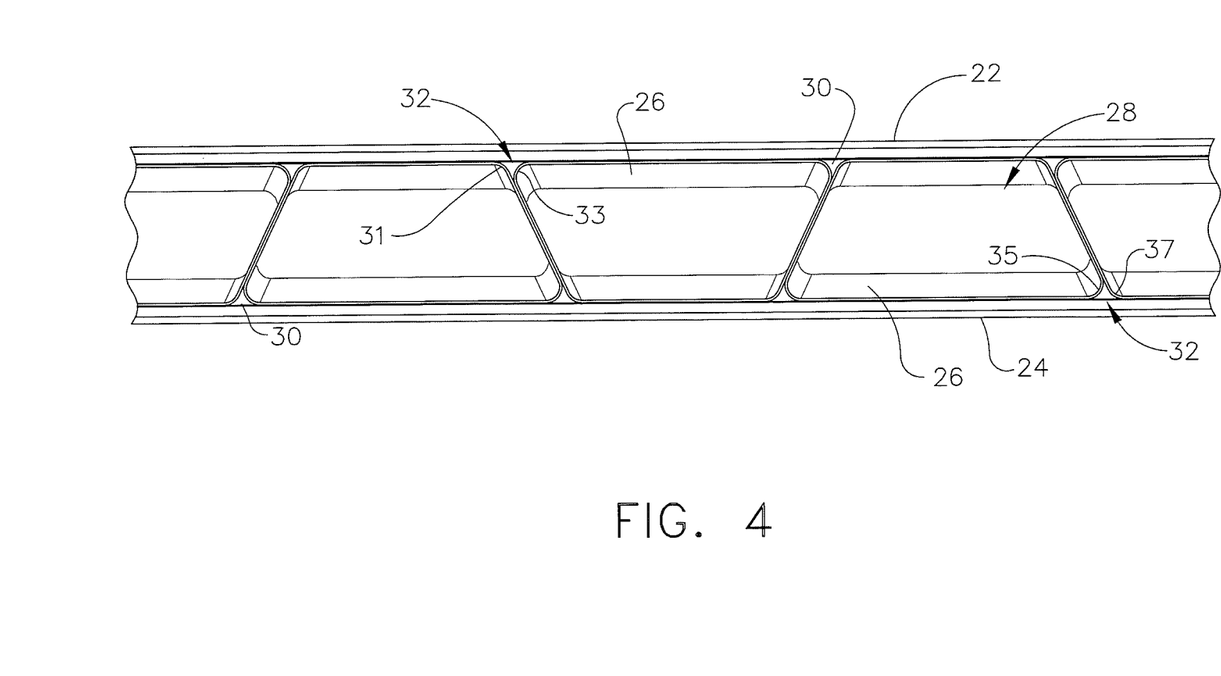
FIG. 4 is cross section view taken along line 4-4 in FIG. 3.
Figures 5, 6:
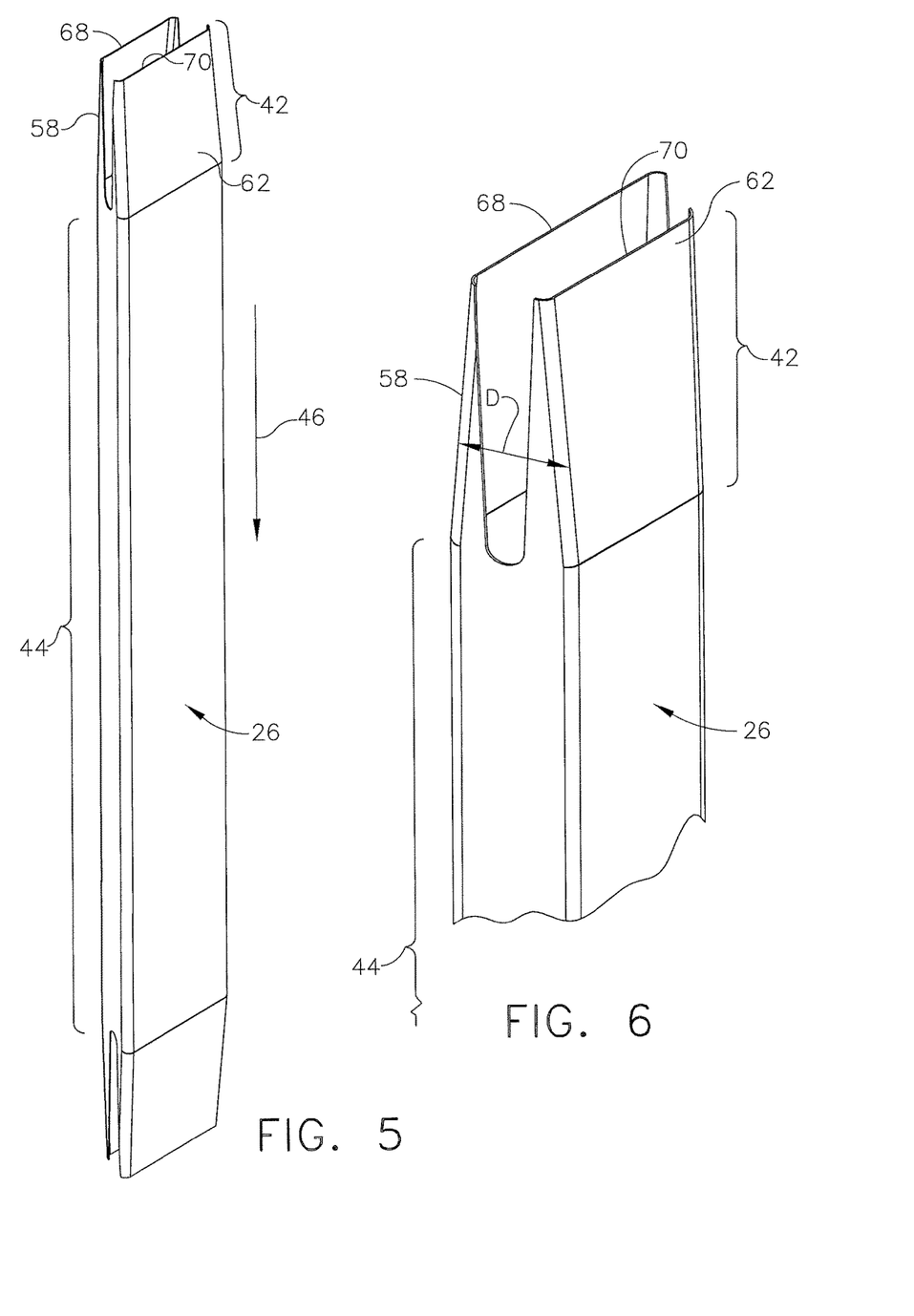
FIG. 5 is a perspective view of a composite flute core member of the composite wall assembly shown in FIG. 3.
FIG. 6 is an enlarged partially cut away view of tapered end of the composite flute core member in FIG. 5.

In referring to FIG. 3, edge joint 16 is shown connecting first section 18 to second section 20 of wall assembly 12. Composite fluted core sandwich shell wall assembly 12 includes first or inboard composite face sheet 22 and spaced apart second or outboard composite face sheet 24. Positioned within the spaced apart first and second composite face sheets 22 and 24 are a plurality of flute composite core members 26. An example of flute composite core member 26 is shown in FIGS. 5 and 6. In this example of wall assembly 12, flute composite core members 26 are trapezoidal in shape, as seen in FIG. 4, however the shape can be selected from one of a number of shapes. In this example, trapezoidal shaped flute composite core members 26 are positioned between first and second composite face sheets 22, 24 in succession forming core assembly 28, as seen in FIG. 4. Flute composite core members 26 can be further reinforced with employing a noodle 30 structure positioned in a cavity 32 that forms between adjacent radiuses 31 and 33 of flute composite core members 26 and first composite face sheet 22, as well as, between adjacent radiuses 35 and 37 of flute composite core members 26 and second composite face sheet 24. Wall assembly 12 with core assembly 28 provides a strong and lightweight construction.

In referring to FIGS. 5-8A, composite fluted core sandwich wall assembly 12 with edge joint 16 is shown which accommodates higher line load demands exerted through edge joint 16, whether exerted in compression or in tension. In referring to FIG. 7, first composite buildup pad 34 having first tapered section 36 is secured to and extends along first or inboard composite face sheet 22. Second composite buildup pad 38 having a second tapered section 40 is secured to and extends along second or outboard composite face sheet 24. First and second composite buildup pads 34 and 38 are positioned between spaced apart first and second composite face sheets 22 and 24. Composite flute core member 26 includes tapered first portion 42 and is positioned between and secured to first tapered section 36 and to second tapered section 40. Second portion 44, as seen in FIG. 5, of composite flute core member 26 is positioned between, extends along and is secured to first and second composite face sheets 22 and 24. Second portion 44 of composite flute core member 26 extends in direction 46 away from first portion 42. This construction of tapered first portion 42 of flute composite core member 26 being secured to first and second tapered sections 36 and 40 of first and second composite buildup pads 34 and 38, respectively, provides enhanced load line capabilities for joint edge 16.

Figure 7:
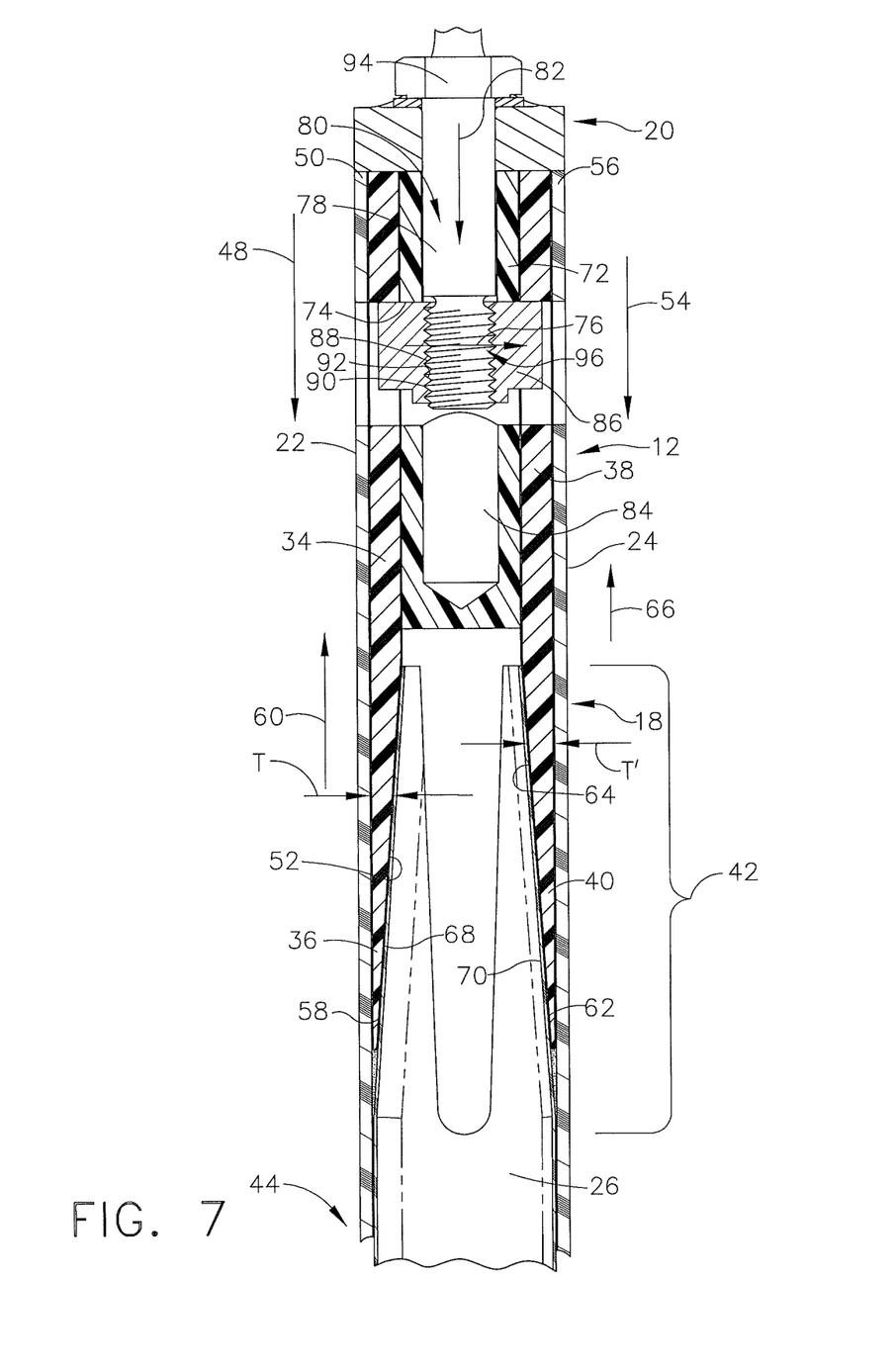
FIG. 7 is a cross section view of the joint edge of the composite wall assembly as seen along line 7-7 in FIG. 3.
Figure 8:
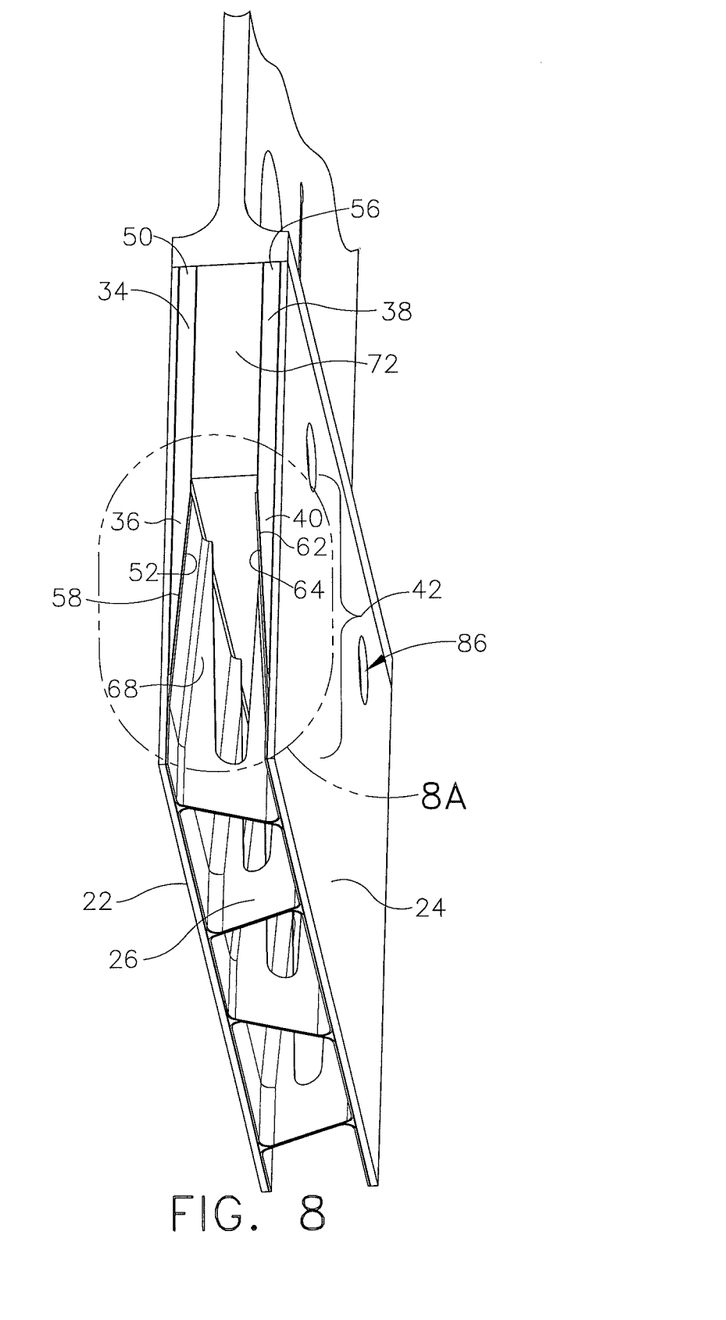
FIG. 8 is a perspective view of cross section as taken along line 4-4 of FIG. 3.
Figure 8A:
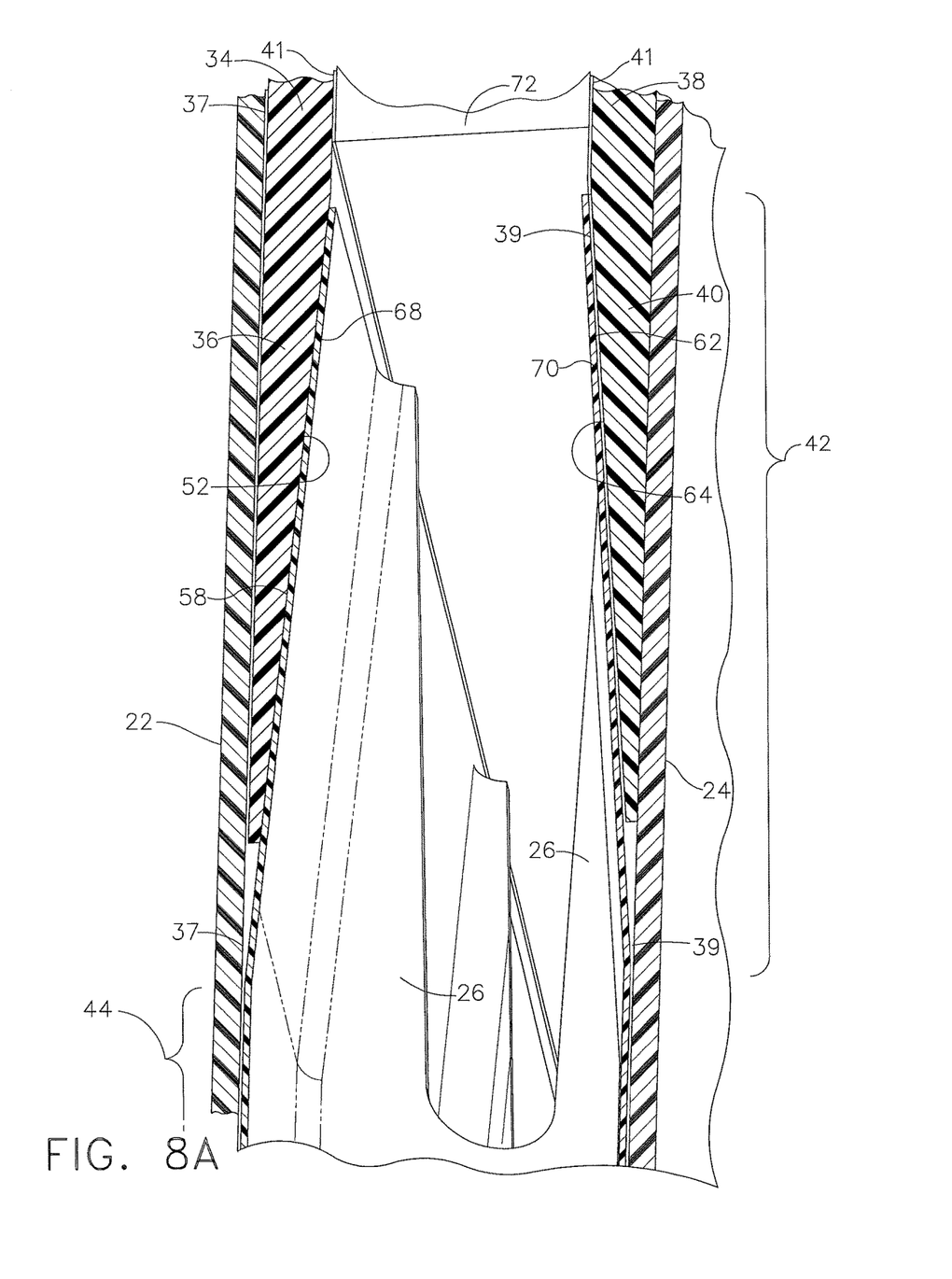
FIG. 8A is an enlarged view of that which is encircled as 8A in FIG. 8.

As seen in FIGS. 7, 8 and 8A, first composite buildup pad 34 extends in a direction 48 away from first end 50 of first or inboard composite sheet face 22. First tapered section 36 of first composite buildup pad 34 has first inclined surface 52 with a thickness T of first tapered section 36 reducing in dimension as first composite buildup pad 34 extends in direction 48 away from first end 50. Second composite buildup pad 38 extends in direction 54 away from second end 56 of second or outboard composite sheet face 24. Second tapered section 40 of second composite buildup pad 38 has second inclined surface 64 with thickness T' of second tapered section 40 reducing in dimension as second composite buildup pad 38 extends in direction 54 away from second end 56.

First portion 42 of flute core member 26 has first inclined surface 58 relative to first composite face sheet 22. Inclined surface 58 extends along first inclined surface 52 of first composite build up pad 34 such that first inclined surface 58 of first portion 42 of composite flute core member 26 is positioned further from first composite face sheet 22 as first portion 42 of composite flute core member 26 extends in direction 60 toward first end 50 of first composite face sheet 22. First portion 42 of composite flute core member 26 has second inclined surface 62 relative to second or outboard face sheet 24 which extends along second inclined surface 64 of the second build up pad 38 such that second inclined surface 62 of first portion 42 of composite flute core member 26 is positioned further from second or outboard face sheet 24 as first portion 42 extends in direction 66 toward second end 56 of second composite face sheet 24.

As seen in FIGS. 5 and 6, first portion 42 of composite flute core member 26 includes first wall member 68 with first inclined surface 58 of first portion 42 of composite flute core member 26 positioned on first wall member 68. First portion 42 of composite flute core member 26 includes second wall member 70 with second inclined surface 62 of first portion 42 of composite flute core member 26 is positioned on second wall member 70. First wall member 68 and second wall member 70 are spaced apart a as seen for example as distance D, as seen in FIG. 6, and converge as first wall member 68 extends in direction 60 of first end 50 of first composite face sheet 22, as seen in FIG. 7, and second wall member 70 extends in direction 66 of second end 56 of the second composite face sheet 24.

As seen in FIGS. 5-8A, first inclined surface 58 of first portion 42 of composite flute core member 26 is co-cured to first inclined surface 52 of first composite build up pad 34. Second inclined surface 62 of the first portion 42 of the composite flute core member 26 is co-bonded to the second inclined surface 64 of second composite build up pad 38. Second portion 44 of composite flute core member 26 is co-bonded to first composite face sheet 22 and to second composite face sheet 24. First composite build up pad 34 is co-bonded to first composite face sheet 22 and second composite build up pad 38 is co-cured to second composite face sheet 24.

In referring to FIGS. 7, 8 and 8A, bridge composite structure 72 is positioned between first composite buildup pad 34 and second composite buildup pad 38. Bridge composite structure 72 is secured to both first and second build up pads 34 and 38 and extends along first composite buildup pad 34 in direction 48 away from first end 50 of first composite face sheet 22 and extends along second composite buildup pad 38 in direction 54 away from second end 56 of second composite face sheet 24.

Bridge composite structure 72, in this example, is post bonded to first composite build up pad 34 and is post bonded to second composite build up pad 38. Further included is first hole 74 which extends in first direction 76 through first composite sheet face 22, first composite build up pad 34, bridge composite structure 72, second composite buildup pad 38 and second composite face sheet 24. First portion 78 of second hole 80 extends through bridge composite structure 72 in second direction 82 transverse to first direction 76 of first hole 74 such that first portion 78 of second hole 80 is in communication with first hole 74 and second portion 84 of second hole 80 extends within bridge composite structure 72 in second direction 82 spaced apart across first hole 74 and aligned with first portion 78 of second hole 80.

Further included is barrel nut 86 having hole 88, which extends through barrel nut 86, with barrel nut 86 positioned within first hole 74 of bridge composite structure 72. Barrel nut 86 has threaded surface 90 defined by inner wall surface 92 of hole 88 with hole 88 of barrel nut 86 positioned aligned with first and second portions 78 and 84 of second hole 80 of bridge composite structure 72. Bolt 94 includes threads 96 compatible to threaded surface 90 defined by the inner wall surface 92 of hole 88 of barrel nut 86. Bolt 94 is positioned within first portion 78 of second hole 80 of bridge composite structure 72. Threads 96 of bolt 94 engage threaded surface 90 defined by inner wall surface 92 of hole 88 of barrel nut 86. With bolt 94 engaged and tightened, as seen in FIG. 7, first section 18 is secured to second section 20 of wall assembly 12.

As will be appreciated in the discussion of an example of the assembly of edge joint 16, composite bridge structure 72 will be installed as a latter element in the joint edge 16 construction which includes the components of first composite or inboard sheet face 22, first composite buildup pad 34, flute composite core member 26, second composite buildup pad 38 and second composite or outboard face sheet 24. With these components assembled composite bridge structure 72 is installed along wall assembly 12. Composite bridge structure 72 can provide the fabricator as needed a substantially continuous wall which extends about wall assembly 12 in which to drill second holes 80 with intersecting corresponding first holes 74. With a substantially continuous wall established by bridge composite structure 72, the fabricator has the flexibility of selectively spacing connecting assemblies of barrel nuts 86 and bolts 94 along joint edge 16 of wall assembly 12 to accommodate load demands as needed through joint edge 16 along wall assembly 12 in connecting, for example, section 18 to section 20 of wall assembly 12. As a result, the fabricator selects the spacing and employs the spacing, as can be seen for example in FIG. 3, as required for load transference across joint edge 16. The load lines will extend along first and second buildup pads 34 and 38, along first and second tapered sections 36 and 40, engage first and second walls 68 and 70 of composite flute core member 26 and in turn extend into first and second face sheets 22 and 24 providing joint edge 16 with an enhanced performance for wall assembly 12.

Figure 9:
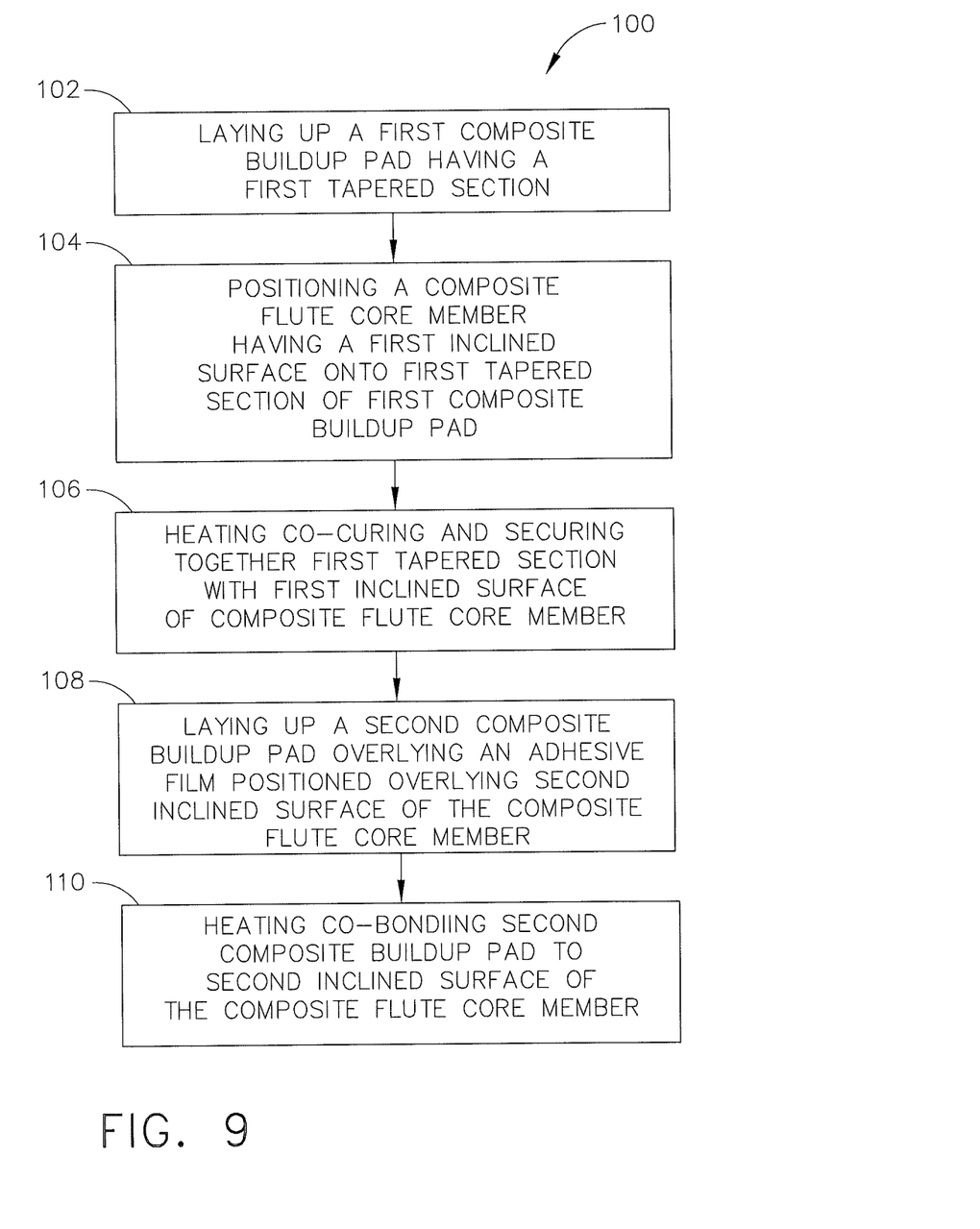
FIG. 9 is a flow chart for a method for assembling a composite wall assembly edge joint.

In referring to FIG. 9, an example of method 100 for assembling composite fluted core sandwich shell wall assembly 12 edge joint 16 is shown. Method 100 includes step 102 of laying up first composite buildup pad 34 having a first tapered section 36 onto a cured first composite or inboard face sheet 22, with an adhesive layer 37, as seen in FIG. 8A, positioned between first composite buildup pad 34 and first composite face sheet 22. Step 102 of laying up first buildup pad 34 further includes the step of laying up of first buildup pad 34 which extends in a direction 48 away from first end 50 of first composite face sheet 22 and configuring first tapered section 36 having first inclined surface 52 with thickness T of first composite buildup pad 34 reducing in dimension as first composite buildup pad 34 extends in direction 48 away from first end 50.

Method 100 further includes step 104 of positioning composite flute core member 26, which includes tapered first portion 42, having a first inclined surface 58 and a second inclined surface 62, wherein, first inclined surface 58 of composite flute core member 26 is positioned onto first tapered section 36 of first composite buildup pad 34. Second portion 44 of composite flute core member 26, as seen in FIG. 5, extends in direction 46 away from first portion 42 along first composite or inboard face sheet 22, as seen in FIGS. 7 and 8A, with adhesive film 37 positioned between second portion 44 of flute composite core member 26 and first composite face sheet 22. Step 104 of positioning of composite flute core member 26 further includes positioning first inclined surface 58 of composite flute core 26 overlying first inclined surface 52 of first composite buildup pad 34 such that first inclined surface 58 of composite flute core member 26 increases in distance away from first composite face sheet 22 as composite flute core member 26 extends in a direction 60 toward first end 50 of first composite sheet face 22.

Method 100 further includes step 106 of heating at least first composite buildup pad 34 and composite flute core member 26, co-curing first composite buildup pad 34 and composite flute core member 26 and securing together first tapered section 36 of first composite buildup pad 34 with first inclined surface 58 of composite flute core member 26 and co-bonding second portion 44 of composite flute core member 26 to first composite or inboard face sheet 22. At the same time, first composite build up pad 34 is co-bonded to first composite face sheet 22.

Method 100 further includes step 108 of laying up second composite buildup pad 38 having a second tapered section wherein the second composite buildup pad is positioned spaced apart from first composite buildup pad 34 and with at least a portion of the second tapered section of second composite buildup pad 38 overlying an adhesive film 39, as seen in FIG. 8A, positioned overlying second inclined surface 62 of first portion 42 of composite flute core member 26. Step 108 of laying up second composite buildup pad 38 includes configuring second inclined surface 64 of second composite buildup pad 38 with second composite buildup pad 38 reducing in thickness T' as second composite buildup pad 38 extends in direction 54 away from second end 56 of second composite face sheet 24 with second inclined surface 62 of first portion 42 of composite flute core member 26 decreases in distance from first composite face sheet 22 as second inclined surface 62 of composite flute core member 26 extends in direction 60 toward first end 50 of first composite face sheet 22.

With second composite buildup pad 38 positioned overlying second inclined surface 62 of composite flute core member 26 step 110 is employed of heating at least second composite buildup pad 38 and co-bonding second composite buildup pad 38 to second inclined surface 62 of first portion 42 of composite flute core member 26.

Step 108 of laying up second composite buildup pad 38 further includes the step of laying up a second composite face sheet 24 onto second composite build-up pad 38 and onto second portion 44 of composite flute core member 26 with positioning adhesive film 39 between second portion 44 of composite flute core member 26 and second composite face sheet 24, as seen in FIG. 8A. Step 110 of heating at least second composite buildup pad 38 further includes co-curing second composite buildup pad 38 and second composite face sheet 24 together and co-bonding second portion 44 of composite flute core member 26 to second composite face sheet 24.

Method 100 further includes a step of laying up composite bridge structure 72 and post bonding composite bridge structure 72 to first and second composite buildup pads 36 and 38 respectively, with adhesive film 41, as seen in FIG. 8A. Adhesive film 41 is positioned between composite bridge structure 72 and first composite build up pad 36 and between composite bridge structure 72 and second composite buildup pad 38.

With composite bridging structure 72 post bonded to first and second composite buildup pads 34 and 38, respectively, the step of laying up composite bridge structure 72 further includes a step of drilling first hole 74 in a first direction 76 through first composite face sheet 22, first composite buildup pad 34, composite bridge structure 72, second composite buildup pad 38 and second composite face sheet 24. The step of laying up the composite bridge structure 72 further includes a step of drilling first portion 78 of second hole 80 in composite bridge structure 72 in a direction 82 transverse to first direction 76 placing first portion 78 in communication with first hole 74 and continue drilling second portion 84 of second hole 80 spaced apart across first hole 74 from first portion 78 of second hole 80 and aligned with first portion 78 of second hole 80. With first hole 74 and second hole 80 drilled, the step of laying up composite bridge structure 72 further includes a step of inserting barrel nut 86 into first hole 74 and inserting bolt 94 into second hole 80 and securing bolt 94 to barrel nut 86. With securement of bolt 94, first section 18 and second section 20 of wall assembly 12 are secured together as seen in FIG. 7.

While various embodiments have been described above, this disclosure is not intended to be limited thereto. Variations can be made to the disclosed embodiments that are still within the scope of the appended claims.

What is claimed:

1. A composite wall assembly edge joint, comprising:
    a first composite buildup pad having a first tapered section is secured to and extends along a first composite face sheet;
    a second composite buildup pad having a second tapered section is secured to and extends along a second composite face sheet, wherein the first and second composite buildup pads are positioned between spaced apart first and second composite face sheets; and
    a composite flute core member comprising:
        a tapered first portion positioned between and secured to the first tapered section and to the second tapered section; and
        a second portion of the composite flute core member extends in a direction away from the tapered first portion of the composite flute core member and is positioned between, extends along and is secured to the first and second composite face sheets.

2. A composite wall assembly edge joint of claim 1, wherein:
    the first composite buildup pad extends in a direction away from a first end of the first composite sheet face;
    the first tapered section of the first composite buildup pad has a first inclined surface with a thickness of the first tapered section reducing in dimension as the first composite buildup pad extends in the direction away from the first end;
    the second composite buildup pad extends in a direction away from a second end of the second composite sheet face; and
    the second tapered section of the second composite buildup pad has a second inclined surface with a thickness of the second tapered section reducing in dimension as the second composite buildup pad extends in the direction away from the second end.

3. The composite wall assembly edge joint of claim 2, further including a bridge composite structure positioned between the first composite buildup pad and the second composite buildup pad, wherein:
    the bridge composite structure is secured to both the first and second build up pads; and
    the bridge composite structure extends along the first composite build up pad in a direction away from the first end of the first composite face sheet and extends along the second composite buildup pad in a direction away from the second end of second composite face sheet.

4. The composite wall assembly edge joint of claim 3, edge joint further including the bridge composite structure is post bonded to the first composite build up pad and is post bonded to the second composite build up pad.

5. The composite assembly edge joint of claim 4, further including a first hole extending in a first direction through the first composite sheet face, the first composite build up pad, the bridge composite structure, the second composite buildup pad and the second composite face sheet.

6. The composite wall assembly edge joint of claim 5, further including a first portion of a second hole extending through the bridge composite structure in a second direction transverse to the first direction of the first hole such that the first portion of the second hole is in communication with the first hole and a second portion of the second hole extends within the bridge composite structure in the second direction spaced apart across the first hole and aligned with the first portion of the second hole.

7. The composite wall assembly edge joint of claim 6, further including a barrel nut having a hole which extends through the barrel nut with the barrel nut positioned within the first hole of the bridge composite structure, wherein:
    the barrel nut having a threaded surface defined by an inner wall surface of the hole; and
    the hole of the barrel nut is positioned aligned with the first and second portions of the second hole of the bridge composite structure.

8. The composite wall assembly edge joint of claim 7, further including a bolt comprising threads compatible to the threaded surface defined by the inner wall surface of the hole of the barrel nut, wherein:
    the bolt is positioned within the first portion of the second hole of the bridge composite structure; and
    the threads of the bolt engage the threaded surface defined by the inner wall surface of the hole of the barrel nut.

9. The composite wall assembly edge joint of claim 2, further including:
    the tapered first portion of the flute core member having a first inclined surface relative to the first face sheet and extends along the first inclined surface of the first composite build up pad such that the first inclined surface of the first portion of the composite flute core member is positioned further from the first composite face sheet as the first portion of the composite flute core member extends in a direction toward the first end of the first composite face sheet; and the first portion of the composite flute core member having a second inclined surface relative to the second face sheet and extends along a second inclined surface of the second build up pad such that the second inclined surface of the first portion of the composite flute core member is positioned further from second face sheet as the first portion extends in a direction toward the second end of the second composite face sheet.

10. The composite wall assembly edge joint of claim 9, further including:

the first portion of the composite flute core member comprising a first wall member with the first inclined surface of the first portion of the composite flute core member positioned on the first wall member and the first portion of the composite flute core member comprising a second wall member with the second inclined surface of the first portion of the composite flute core member positioned on the second wall member; and the first wall member and the second wall member are spaced apart and converge as the first wall member extends in the direction of the first end of the first composite face sheet and the second wall member extends in a direction of the second end of the second composite face sheet.

11. The composite wall assembly edge joint of claim 9, further including:

the first inclined surface of the tapered first portion of the composite flute core member is co-cured to the first inclined surface of the first composite build up pad;

the second inclined surface of the first portion of the composite flute core member is co-bonded to the second inclined surface of the second composite build up pad; and the second portion of the composite flute core member is co-bonded to the first composite face sheet and to the second composite face sheet.

12. The composite wall assembly edge joint of claim 1, further including the first composite build up pad is co-bonded to the first composite face sheet and the second composite build up pad is co-cured to the second composite face sheet.

13. A method for assembling a composite wall assembly edge joint, comprising the steps of:

laying up a first composite buildup pad having a first tapered section onto a cured first composite face sheet with an adhesive layer positioned between the first composite buildup pad and the first composite face sheet;

positioning a composite flute core member, comprising a tapered first portion comprising a first inclined surface and a second inclined surface wherein:

the first inclined surface of the composite flute core member is positioned onto the first tapered section of the first composite buildup pad; and a second portion of the composite flute core member extends from the first portion along first composite face sheet with an adhesive film positioned between the second portion and the first composite face sheet;

heating at least the first composite buildup pad and the composite flute core member, co-curing the first composite buildup and the composite flute core member securing together the first tapered section of the first composite buildup pad with the first inclined surface of the composite flute core member and co-bonding the second portion of the composite flute core member to the first composite face sheet;

laying up a second composite buildup pad having a second tapered section wherein the second composite buildup pad is positioned spaced apart from the first composite buildup pad and with at least a portion of the second tapered section of the second composite buildup pad overlying an adhesive film positioned overlying the second inclined surface of the tapered first portion of the composite flute core member; and heating at least the second composite build up pad and co-bonding the second composite buildup pad to the second inclined surface of the first portion of the composite flute core member.

14. The method for assembling a composite wall assembly edge joint of claim 13, wherein:

the step of laying up the first buildup pad further including the step of laying up of the first buildup pad which extends in a direction away from a first end of the first composite face sheet and configuring the first tapered section having a first inclined surface with a thickness of the first composite buildup pad reducing in dimension as the first composite buildup pad extends in a direction away from the first end;

the step of positioning of the composite flute core member further including positioning the first inclined surface of the composite flute core overlying the first inclined surface of the first composite buildup pad such that the first inclined surface of the composite flute core member increases in distance away from the first composite face sheet as the composite flute core member extends in a direction toward the first end of the first composite sheet face; and the step of laying up the second composite buildup pad including configuring a second inclined surface of the second composite buildup pad with the second composite buildup pad reducing in thickness as the second composite buildup pad extends in a direction away from the first end of the first composite face sheet with the second inclined surface of the first portion of the composite flute core member decreases in distance from the first composite face sheet as the second inclined surface of the composite flute core member extends in a direction toward the first end of the first composite face sheet.

15. The method for assembling a composite wall assembly edge joint of claim 13, the step of laying up the second composite buildup pad further including the step of laying up a second composite face sheet onto the second composite build-up pad and onto the second portion of the composite flute core member with positioning an adhesive film between the second portion of the composite flute core member and the second composite face sheet.

16. The method for assembling a composite wall assembly edge joint of claim 15, the step of heating at least the second composite buildup pad further including co-curing the second composite buildup pad and the second composite face sheet together and co-bonding the second portion of the composite flute core member to the second composite face sheet.

17. The method for assembling a composite wall assembly edge joint of claim 16, further including the step of laying up a composite bridge structure and post bonding the composite bridge structure to the first and second composite buildup pads.

18. The method for assembling a composite wall assembly edge joint of claim 17, further including the step of drilling a first hole in a first direction through the first composite face sheet, the first composite buildup pad, the composite bridge structure, the second composite buildup pad and the second composite face sheet.

19. The method for assembling a composite wall assembly edge joint of claim 18, further including the step of drilling a first portion of a second hole in the composite bridge structure in a direction transverse to the first direction placing the first portion in communication with the first hole and continue drilling a second portion of the second hole spaced apart across the first hole from the first portion of the second hole and aligned with the first portion of the second hole.

20. The method for assembling a composite wall assembly edge joint of claim 19, further including the step of inserting a barrel nut into the first hole and inserting a bolt into the second hole and securing the bolt to the barrel nut.

\* \* \* \* \*

UNITED STATES PATENT AND TRADEMARK OFFICE
CERTIFICATE OF CORRECTION

PATENT NO.         : 10,173,406 B2
APPLICATION NO.    : 15/432024
DATED              : January 8, 2019
INVENTOR(S)        : Juan Carlos Guzman et al.

Page 1 of 1

It is certified that error appears in the above-identified patent and that said Letters Patent is hereby corrected as shown below:

In the Claims

At Column 7, Line 62, "A composite" should be -- The composite --.

At Column 8, Line 28, "composite assembly" should be -- composite wall assembly --.

Signed and Sealed this
Fourth Day of June, 2019

Andrei Iancu
*Director of the United States Patent and Trademark Office*